United States Patent Office 3,595,895
Patented July 27, 1971

3,595,895
NOVEL DISILOXANE COMPOUNDS
Richard P. Bush and Christopher Arthur Pearce, Glamorgan, Wales, assignors to Midland Silicones Limited, Reading, Berkshire, England
No Drawing. Filed Sept. 23, 1968, Ser. No. 761,814
Claims priority, application Great Britain, Oct. 5, 1967, 45,558/67
Int. Cl. C07f 7/02
U.S. Cl. 260—448.2N    11 Claims

ABSTRACT OF THE DISCLOSURE

Novel disiloxane compounds of the general formula $(R_3Si)_2NSiR'_2OSiR''_2X$ wherein R repersents hydrogen, an alkyl, alkenyl or a monocyclic aryl radical, R' being an alkyl or alkenyl or a monocyclic aryl, R'' being a monovalent hydrocarbon radical and X being hydrogen, a halogen, an alkoxy, a hydroxyl, or a $—NR_2'''$ radical wherein R''' is defined above as R and process of preparing thereof are included in this invention. The disiloxanes are useful as intermediates in the preparation of other organosilicon products or in the modification of organic compounds by reaction therewith.

---

This invention relates to novel disiloxane compounds wherein there is present a nitrogen atom being directly linked thereto to three silicon atoms.

According to certain aspects of the invention there are provided novel disiloxanes of the general formula $$(R_3Si)_2NSiR'_2OSiR''_2X$$

wherein each R represents a hydrogen atom, an alkyl or alkenyl radical containing less than 6 carbon atoms or a monocyclic aryl radical, not more than two R groups attached to any silicon atom being hydrogen atoms, each R' represents an alkyl or alkenyl radical containing less than 6 carbon atoms or a monoyclic aryl radical, each R'' represents a monovalent hydrocarbon radical and X represents a hydrogen atom, a chlorine atom, a bromine atom, an alkoxy radical, a hydroxyl radical or the radical $—NR_2'''$ wherein each R''' is a hydrogen atom, an alkyl radical or an aryl radical.

In the general formula R and R' can represent for example methyl, ethyl, propyl, butyl, vinyl, allyl, phenyl, p-tolyl, p-xylyl and nitrophenyl radicals. R can also represent a hydrogen atom except that not more than two R groups attached to any one silicon atom can be hydrogen. The radicals represented by R'' can be any monovalent hydrocarbon radicals, for example, alkyl radicals such as methyl, ethyl or propyl radicals, alkenyl radicals such as vinyl, allyl and cyclohexenyl radicals and aromatic hydrocarbon radicals such as phenyl, xenyl and tolyl radicals. Preferably, the R, R' and R'' are selected from lower alkyl radicals and are most preferably methyl radicals.

The disiloxanes of this invention wherein X in the general formula represents a hydrogen atom can be prepared by the reaction of (1) an amino silanol of the general formula $(R_3Si)_2NSiR'_2OH$ with (2) a disilazane of the general formula $(HR''_2Si)_2NH$, wherein the general formulae R, R' and R'' have the significance hereinbefore ascribed. This invention includes the process for making this novel compound.

The disilazane reactants which are employed in the process of this invention are well known materials and are readily prepared. Preparation of the silanol reactant can be achieved, for example, by the hydrolysis of a compound of the formula $(R_3Si)_2NSiR'_2Y$ wherein Y is an amino group, or of the formula $(R_3Si)_2NSiR'_2Cl$.

Reaction between the disilazane and the amino silanol is preferably performed in the presence of an acidic catalyst for example sulphuric acid, acid salts of amines or ammonia or chlorosilanes. The reaction can also be further expedited if desired by the application of heat. However, high temperatures are best avoided as these can cause decomposition of the amino silanol or its conversion into other amino organosilicon materials. Generally, we prefer to carry out the reaction at temperatures in the range from 20 to 60° C. Inert solvents, for example, hydrocarbons such as toluene and xylene or oxygenated hydrocarbons such as diethyl ether and tetrahydrofuran can be empolyed in the reaction mixture if desired. In most cases, however, the reaction can be satisfactorily carried forward in the absence of such solvents. Recovery of the desired reaction product can be accomplished by any suitable method such as by fractional distillation. The relative proportions of the reactants (1) and (2) employed is not critical. Preferably, however, they are used in stoichiometric or approximately stoichiometric proportions, that is, a ratio of 2 mols of the amino silanol (1) to 1 mol of the disilazane (2).

The compounds of this invention wherein X represents a chlorine or bromine atom can be prepared from the corresponding disiloxane compound wherein X is hydrogen by halogenation of the silicon-bonded hydrogen atom. Halogenation can be carried out by any suitable means such as by the passage of chlorine through a solution of the disiloxane in a solvent such as carbon tetrachloride. Preferably, the temperature of the solution is maintained below 20° C. during the halogenation step. It is desirable to include in the reaction mixture during halogenation a hydrogen halide acceptor in order to minimize the effect of the by-produced hydrogen halide on the silicon-nitrogen bonds in the reactant and in the desired reaction product.

Preparation of the novel compounds of this invention wherein X is an alkoxy radical, for example, the methoxy, ethoxy or butoxy radical, can be achieved by alkoxylation of the corresponding halogenated disiloxane, that is, by the reaction of the appropriate alcohol with a compound of the general formula $(R_3Si)_2NSiR'_2OSiR''_2X$ where X is chlorine or bromine. Methods for carrying out the conversion of silicon-bonded halogen atoms to silicon-bonded alkoxyl radicals are well known in the art of organosilicon chemistry. Preferably, in this case, the alkoxylation reaction is performed in the presence of a hydrogen halide acceptor for the reason set forth above.

Compounds according to this invention wherein X in the general formula represents the amino radical $—NR'''_2$ can be obtained from the corresponding halogenated derivatives referred to hereinabove by reacting the said halogenated derivative with ammonia or with the appropriate amine, for example, methylamine, ethylamine or butylamine. Thus, for example, the compound $$(R_3Si)_2NSiR'_2OSiR''_2Cl$$

can be converted to the compound $$(R_3Si)_2NSiR'_2OSiR''_2NH(C_2H_5)$$

by reaction with ethylamine.

In the amino group $—NR'''_2$ each of the R''' groups can be alike or different and can each represent a hydrogen atom, an alkyl radical such as methyl, ethyl or propyl or an aryl radical such as phenyl. Preferably, however, at least one of the R''' radicals is the methyl or ethyl radical.

Compounds of this invention wherein X in the general formula represents a hydroxyl radical can be prepared by hydrolysis of the corresponding compounds wherein X represents a halogen atom, an alkoxy radical or the radical $—NR'''_2$. Preferably, the silanol is obtained from the amino-substituted compounds. Hydrolysis of the halogenated compound in the absence of a hydrogen halide acceptor gives rise to a by-product which can react to cleave the silicon-nitrogen bonds in the desired product.

The compounds of this invention are useful as intermediates in the preparation of other organosilicon products or in the modification of organic compounds by reaction therewith. For example, the compounds wherein X represents the hydrogen atom can be added to organic or organosilicon compounds containing aliphatically unsaturated groups in the presence of platinum or a free radical generating catalyst.

The following examples illustrate the invention and are not intended to limit the scope of the invention in any way.

EXAMPLE 1

The compound [(CH$_3$)$_3$Si]$_2$NSi(CH$_3$)$_2$OH, (88 g., 2 mol.), tetramethyl disilazane (25 g., 1 mol) and chlorodimethylsilane (0.5 ml.) as catalyst were mixed and allowed to stand at room temperature for 6 days during which time a quantity of ammonia was evolved. The mixture was then distilled to yield 1-bis(trimethylsilyl) amino-1,1,3-3-tetramethyldisiloxane

(90 g., 82%) B.P. 73°/3 mm. $n_D^{25}$ 1.4340. Found (percent): C, 41.3; H, 10.58; N, 4.73; Si, 38.55. C$_{10}$H$_{31}$NOSi$_4$ requires (percent): C, 41.0; H, 10.6; N, 4.78; Si, 38.23.

EXAMPLE 2

A stream of dry chlorine was passed into a solution of the disiloxane (52.8 g., 1 mol) prepared in Example 1 and pyridine (15.7 g. 1.1 mol) in carbon tetrachloride (500 ml.) at 0° C. The reaction was followed by vapor phase chromatography and the passage of the chlorine terminated when chlorination of the silicon-hydrogen groups was shown to be complete. The reaction product was then filtered and distillation of the filtrate yielded 1-bis(trimethylsilyl)amino - 1,1,3,3 - tetramethyl - 3-chlorodisiloxane (43.8 g., 74%) B.P. 66°/0.8 mm. Hg.

EXAMPLE 3

Diethylamine (18.6 g., 2 mol) was added to a solution in pentane (500 ml.) of the chlorodisiloxane (42.0 g., 1 mol) prepared in Example 2 and the mixture stirred at room temperature for 20 hours. The reaction mixture was then filtered and distillation of the filtrate yielded 1-bis-(trimethylsilyl)amino - 1,1,3,3 - tetramethyl - 3 - diethylamino disiloxane (36.0 g., 77%) B.P. 90°/0.5 mm.

EXAMPLE 4

The diethylamine-substituted disiloxane prepared in Example 3 (30.4 g., 1 mol) and water (1.7 g., 1 mol) were added separately to 1,2-dimethoxyethane, the mixture stirred and allowed to stand at room temperature for 20 hours. The solution was then raised to reflux temperature for a further two hours after which time hydrolysis was shown by vapor phase chromatographic analysis, to be complete. Volatile materials were removed from the reaction mixture by distillation at 20°/1 mm. and further distillation yielded 1-bis(trimethylsilyl) - 1,1,3,3,3 - tetramethyldisiloxane-3-ol (8.4 g., 33%), B.P. 71°/0.5 mm.

EXAMPLE 5

The disiloxane (14.8 g., 1 mol) prepared in Example 1 was added to 1-hexene (4.25 g., 1 mol) containing hexachloroplatinic acid (5 μl. of a 10% w./w. solution in isopropanol) at 95° C. An exothermic reaction occurred and the temperature of the solution rose to 135° C. The solution was allowed to cool to 95° C. and maintained at this temperature for 4 hours. Distillation of the solution after this time yielded 1-bis(trimethylsilyl)amino-1,1,3,3-tetramethyl-3-hexyldisiloxane.

That which is claimed is:

1. Novel disiloxane compounds of the general formula (R$_3$Si)$_2$NSiR'$_2$OSiR''$_2$X wherein each R represents a hydrogen atom, an alkyl or alkenyl radical containing less than 6 carbon atoms or a monocyclic aryl radical, not more than two R groups attached to any silicon atom being hydrogen atoms, each R' represents an alkyl or alkenyl radical containing less than 6 carbon atoms or a monocyclic aryl radical, each R'' represents a monovalent hydrocarbon radical of less than seven carbon atoms and X represents a hydrogen atom, a chlorine atom, a bromine atom, an alkoxy radical of less than 6 carbon atoms, a hydroxyl radical or the radical —NR'''$_2$ where each R''' is a hydrogen atom, a lower alkyl radical or a phenyl radical.

2. Novel disiloxane compounds as claimed in claim 1 wherein each R represents a hydrogen atom, an alkyl radical containing less than 6 carbon atoms or a monocyclic aryl radical, not more than two R groups attached to any silicon atom being hydrogen atoms, and each R' represents an alkyl radical containing less than 6 carbon atoms or a monocyclic aryl radical.

3. Novel disiloxane compositions as claimed in claim 2 wherein R, R' and R'' represent methyl radicals.

4. Novel disiloxane compounds as claimed in claim 1 wherein the compound is a 1-bis(trimethylsilyl)amino-1,1,3,3-tetramethyldisiloxane.

5. Novel disiloxane compounds as claimed in claim 1 wherein the compound is a 1-bis(trimethylsilyl)amino-1,1,3,3-tetramethyl-3-chlorodisiloxane.

6. Novel disiloxane compounds as claimed in claim 1 wherein the compound is a 1-bis(trimethylsilyl)amino-1,1,3,3-tetramethyl-3-diethylaminodisiloxane.

7. Novel disiloxane compounds as claimed in claim 1 wherein the compound is a 1-bis(trimethylsilyl)-1,1,3,3-tetramethyldisiloxane-3-ol.

8. A process for the preparation of a novel disiloxane compound of the general formula (R$_3$Si)$_2$NSiR'$_2$OSiR''$_2$H which comprises reacting (1) an amino silanol of the general formula (R$_3$Si)$_2$NSiR'$_2$OH with (2) a disilazane of the general formulae (HR''Si)$_2$NH, R, R' and R'' in the general formulae being as defined in claim 1.

9. A process as claimed in claim 8 wherein each R represents a hydrogen atom, an alkyl radical containing less than 6 carbon atoms or a monocyclic aryl radical, not more than two R groups attached to any silicon atom being hydrogen atoms, and each R' represents an alkyl radical containing less than 6 carbon atoms or a monocyclic aryl radical.

10. A process as claimed in claim 9 wherein R, R' and R'' are methyl radicals.

11. A process as claimed in claim 8 wherein the reaction is carried out in the presence of an acidic catalyst.

References Cited

UNITED STATES PATENTS

| | | | |
|---|---|---|---|
| 3,414,584 | 12/1968 | Fink | 260—448.8X |
| 3,460,981 | 8/1969 | Keil et al. | 260—448.8X |
| 3,477,901 | 11/1969 | Keil | 260—448.8X |

TOBIAS E. LEVOW, Primary Examiner

W. F. W. BELLAMY, Assistant Examiner

U.S. Cl. X.R.

260—448.2E, 448.8R